US011686844B2

(12) United States Patent
Ogo

(10) Patent No.: US 11,686,844 B2
(45) Date of Patent: Jun. 27, 2023

(54) DISTANCE MEASUREMENT DEVICE, DISTANCE MEASUREMENT METHOD, AND DISTANCE MEASUREMENT PROGRAM

(71) Applicant: FUJIFILM CORPORATION, Tokyo (JP)

(72) Inventor: Tsuyoshi Ogo, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 18/155,749

(22) Filed: Jan. 18, 2023

(65) Prior Publication Data
US 2023/0161037 A1 May 25, 2023

Related U.S. Application Data

(63) Continuation of application No. PCT/JP2021/023576, filed on Jun. 22, 2021.

(30) Foreign Application Priority Data

Jul. 22, 2020 (JP) .................. 2020-125848

(51) Int. Cl.
G01S 17/10 (2020.01)
G01S 7/481 (2006.01)
G01S 7/4865 (2020.01)

(52) U.S. Cl.
CPC ............ *G01S 17/10* (2013.01); *G01S 7/4816* (2013.01); *G01S 7/4865* (2013.01)

(58) Field of Classification Search
None
See application file for complete search history.

(56) References Cited

U.S. PATENT DOCUMENTS

2016/0011311 A1* 1/2016 Mushimoto ........ G06K 7/10831
250/236
2017/0131388 A1* 5/2017 Campbell ............... G01S 17/89
(Continued)

FOREIGN PATENT DOCUMENTS

JP 2010-038859 A 2/2010
JP 2013-210316 A 10/2013
(Continued)

OTHER PUBLICATIONS

International Search Report issued in International Application No. PCT/JP2021/023576 dated Aug. 10, 2021.
(Continued)

*Primary Examiner* — Hovhannes Baghdasaryan
(74) *Attorney, Agent, or Firm* — Solaris Intellectual Property Group, PLLC

(57) ABSTRACT

A distance measurement device includes a light source, a polarization optical member, a reflective member, a first light-receiving element, and a second light-receiving element. The reflective member varies a scan angle for scanning an object to be measured with light from the light source and reflects the light from the light source for each varied scan angle. The polarization optical member guides the light reflected by the reflective member to the object to be measured. The light-receiving element receives reflected light after the light guided by the polarization optical member is reflected by the object to be measured. In a case where the scan angle of the reflective member is a specific angle, the light-receiving element receives the light reflected by the reflective member and the polarization optical member in this order.

11 Claims, 6 Drawing Sheets

(56) References Cited

U.S. PATENT DOCUMENTS

| | | | |
|---|---|---|---|
| 2018/0003803 A1* | 1/2018 | Kakani | G01S 7/4816 |
| 2019/0187459 A1 | 6/2019 | Matsumaru et al. | |
| 2021/0102892 A1* | 4/2021 | Oron | G01S 17/36 |
| 2022/0163788 A1 | 5/2022 | Horiguchi et al. | |

FOREIGN PATENT DOCUMENTS

| | | |
|---|---|---|
| JP | 2014-194380 A | 10/2014 |
| JP | 2016-020834 A | 2/2016 |
| JP | 2016-125970 A | 7/2016 |
| JP | 2019-109351 A | 7/2019 |
| JP | 2019-174297 A | 10/2019 |
| JP | 6704537 B1 | 6/2020 |

OTHER PUBLICATIONS

Written Opinion of the ISA issued in International Application No. PCT/JP2021/023576 dated Aug. 10, 2021.
International Preliminary Report on Patentability issued in International Application No. PCT/JP2021/023576 dated Jan. 11, 2022.

* cited by examiner

DISTANCE MEASUREMENT DEVICE, DISTANCE MEASUREMENT METHOD, AND DISTANCE MEASUREMENT PROGRAM

CROSS-REFERENCE TO RELATED APPLICATIONS

This application is a continuation of International Application No. PCT/JP2021/023576, filed on Jun. 22, 2021, which claims priority from Japanese Application No. 2020-125848, filed on Jul. 22, 2020. The entire disclosure of each of the above applications is incorporated herein by reference.

BACKGROUND

Technical Field

The present disclosure relates to a distance measurement device, a distance measurement method, and a distance measurement program.

Related Art

Generally, a distance measurement technology for measuring a distance to an object to be measured by scanning the object to be measured with light from a light source and measuring a time taken until reflected light reflected by the object to be measured returns has been known (refer to JP2014-194380A, JP2016-125970A, and JP2019-174297A).

In the distance measurement technology, it is necessary to detect a scan angle for scanning the object to be measured. However, in the technologies disclosed in JP2014-194380A, JP2016-125970A, and JP2019-174297A, detection accuracy of the scan angle may not be said to be sufficient. Thus, a technology for improving the detection accuracy of the scan angle is desired.

SUMMARY

The present disclosure is conceived in view of the above matter and provides a distance measurement device, a distance measurement method, and a distance measurement program that can improve detection accuracy of a scan angle for scanning an object to be measured with light from a light source.

A distance measurement device of a first aspect of the present disclosure comprises a light source, a reflective member that varies a scan angle for scanning an object to be measured with light from the light source and reflects the light from the light source for each varied scan angle, a polarization optical member that guides the light reflected by the reflective member to the object to be measured, a first light-receiving section that receives reflected light after the light guided by the polarization optical member is reflected by the object to be measured, and a second light-receiving section that receives the light reflected by the reflective member and the polarization optical member in this order in a case where the scan angle of the reflective member is a specific angle.

A distance measurement device of a second aspect of the present disclosure is the distance measurement device of the first aspect, in which a plurality of the second light-receiving sections are provided in a direction intersecting with a direction in which the polarization optical member guides the light to the object to be measured.

A distance measurement device of a third aspect of the present disclosure is the distance measurement device of the first aspect or the second aspect, in which the reflective member reflects the light a plurality of times by varying the scan angle after the light is reflected in a state where the specific angle is set as the scan angle until the light is reflected in a state where the scan angle is set as the specific angle again, the distance measurement device further comprises at least one processor, and the processor is configured to acquire the number of times of light generation of the light source by the first light-receiving section between a first time at which the second light-receiving section receives the light and a second time at which the second light-receiving section receives the light after the first time, and derive the scan angle corresponding to the reflected light received by the first light-receiving section based on the number of times of light generation.

A distance measurement device of a fourth aspect of the present disclosure is the distance measurement device of the third aspect, in which the processor is configured to derive the scan angle based on a value obtained by dividing an angle of a range in which the reflective member varies the scan angle by a number obtained by subtracting 1 from the number of times of light generation.

A distance measurement device of a fifth aspect of the present disclosure is the distance measurement device of the third aspect or the fourth aspect, in which the processor is configured to associate the scan angle with distance measurement data corresponding to the reflected light received by the first light-receiving section.

A distance measurement device of a sixth aspect of the present disclosure is the distance measurement device of any one aspect of the first aspect to the fifth aspect, in which the polarization optical member includes a transmitting unit through which the light heading toward the reflective member from the light source is transmitted, and a reflecting unit that reflects the light reflected by the reflective member toward the object to be measured and reflects the light reflected by the reflective member toward the second light-receiving section.

A distance measurement device of a seventh aspect of the present disclosure is the distance measurement device of any one aspect of the first aspect to the sixth aspect, in which the polarization optical member further guides the reflected light reflected by the object to be measured to the reflective member and guides the reflected light reflected by the reflective member in a direction of the light source, and the first light-receiving section receives the reflected light guided in the direction of the light source by the polarization optical member.

A distance measurement device of an eighth aspect of the present disclosure is the distance measurement device of the seventh aspect, further comprising a beam splitter that is positioned on an optical path between the light source and the reflective member and on an optical path between the reflective member and the first light-receiving section, causes the light to pass in a direction of the reflective member, and guides the reflected light reflected in the direction of the light source by the reflective member to the first light-receiving section.

A distance measurement device of a ninth aspect of the present disclosure is the distance measurement device of any one aspect of the first aspect to the sixth aspect, further comprising an optical component that guides the reflected light reflected by the object to be measured in a direction different from a direction of the light source, in which the first light-receiving section receives the reflected light guided in the direction different from the direction of the light source by the optical component.

A distance measurement device of a tenth aspect of the present disclosure is the distance measurement device of any one aspect of the first aspect to the ninth aspect, in which the reflective member is a MEMS mirror.

In addition, a distance measurement method of an eleventh aspect of the present disclosure is a distance measurement method by a distance measurement device including a light source, a reflective member that varies a scan angle for scanning an object to be measured with light from the light source and reflects the light from the light source for each varied scan angle, a polarization optical member that guides the light reflected by the reflective member to the object to be measured, a first light-receiving section that receives reflected light after the light guided by the polarization optical member is reflected by the object to be measured, and a second light-receiving section that receives the light reflected by the reflective member and the polarization optical member in this order in a case where the scan angle of the reflective member is a specific angle, in which the reflective member reflects the light a plurality of times by varying the scan angle after the light is reflected in a state where the specific angle is set as the scan angle until the light is reflected in a state where the scan angle is set as the specific angle again, the distance measurement method executed by a processor, comprising acquiring the number of times of light generation of the light source corresponding to the reception of the reflected light by the first light-receiving section between a first time at which the second light-receiving section receives the light and a second time at which the second light-receiving section receives the light after the first time, deriving the scan angle corresponding to the reflected light received by the first light-receiving section based on the number of times of light generation, and associating the scan angle with distance measurement data corresponding to the reflected light received by the first light-receiving section.

In addition, a distance measurement program of a twelfth aspect of the present disclosure is a distance measurement program causing a processor to execute a process for distance measurement by a distance measurement device including a light source, a reflective member that varies a scan angle for scanning an object to be measured with light from the light source and reflects the light from the light source for each varied scan angle, a polarization optical member that guides the light reflected by the reflective member to the object to be measured, a first light-receiving section that receives reflected light after the light guided by the polarization optical member is reflected by the object to be measured, and a second light-receiving section that receives the light reflected by the reflective member and the polarization optical member in this order in a case where the scan angle of the reflective member is a specific angle, in which the reflective member reflects the light a plurality of times by varying the scan angle after the light is reflected in a state where the specific angle is set as the scan angle until the light is reflected in a state where the scan angle is set as the specific angle again, the distance measurement program causing the processor to execute a process comprising acquiring the number of times of light generation of the light source corresponding to the reception of the reflected light by the first light-receiving section between a first time at which the second light-receiving section receives the light and a second time at which the second light-receiving section receives the light after the first time, deriving the scan angle corresponding to the reflected light received by the first light-receiving section based on the number of times of light generation, and associating the scan angle with distance measurement data corresponding to the reflected light received by the first light-receiving section.

According to the present disclosure, detection accuracy of a scan angle for scanning an object to be measured with light from a light source can be improved.

DESCRIPTION

Hereinafter, an embodiment of the present invention will be described in detail with reference to the drawings. It is noted that the present embodiment does not limit the present invention.

Figure 1:
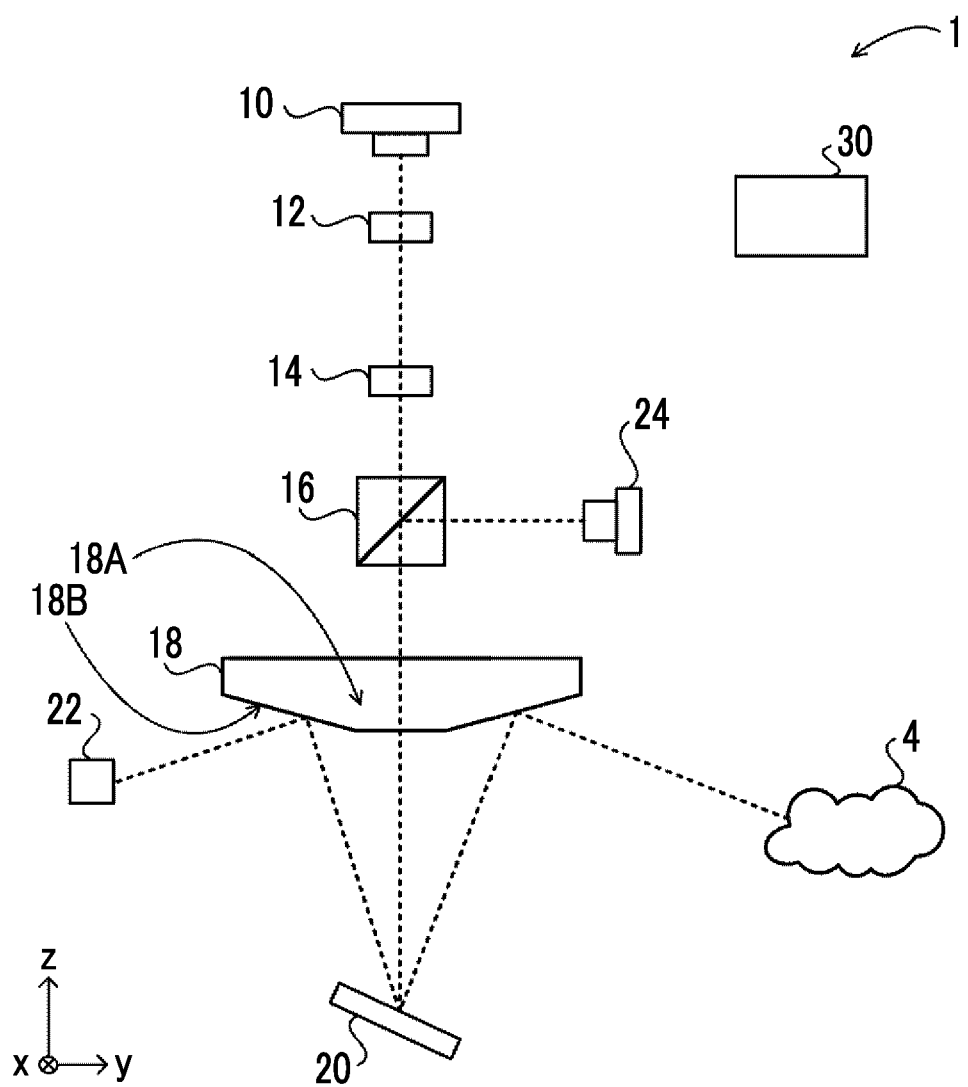
FIG. 1 is a configuration diagram illustrating an example of a distance measurement device of an embodiment.

An example of a configuration of a distance measurement device 1 of the present embodiment is illustrated in FIG. 1. As illustrated in FIG. 1, the distance measurement device 1 of the present embodiment comprises a light source 10, a collimator lens 12, a collimator lens 14, a beam splitter 16, a polarization optical member 18, a reflective member 20, a light-receiving element 22, a light-receiving element 24, and a control unit 30.

The distance measurement device 1 of the present embodiment is a so-called light detection and ranging (LiDAR) system that measures a distance to an object to be measured 4 by scanning the object to be measured 4 with light from the light source 10 and measuring a time taken until reflected light reflected by the object to be measured 4 returns. Hereinafter, the "reflected light" will refer to light reflected by the object to be measured 4. In addition, in FIG. 1, an x axis direction and a y axis direction (xy plane direction) will be referred to as a horizontal direction, and a z axis direction will be referred to as a vertical direction.

Figure 2A:
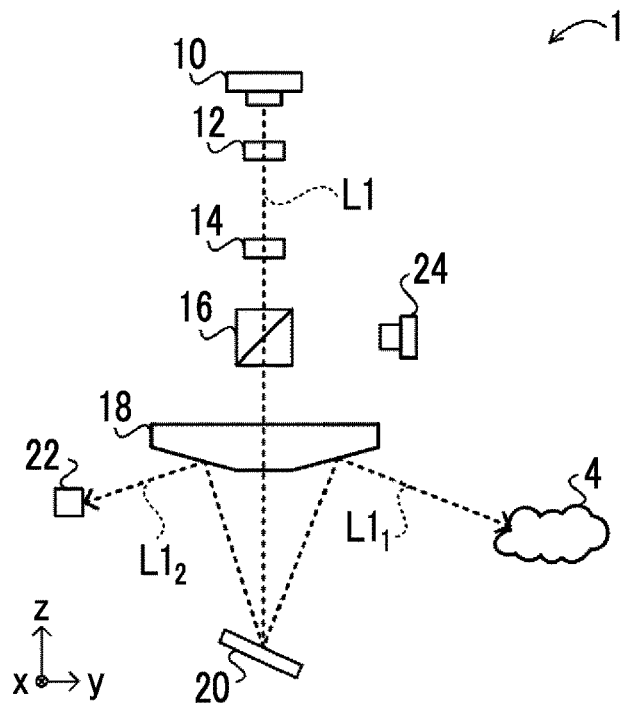
FIG. 2A is a diagram for describing an optical path of light of irradiation from a light source.

As illustrated in FIG. 2A, light L1 of irradiation from the light source 10 is collimated by the collimator lens 12 and the collimator lens 14, transmitted through the beam splitter 16 and the polarization optical member 18, and reflected by the reflective member 20. The object to be measured 4 is irradiated with light $L1_1$ reflected by the reflective member 20. In addition, light $L1_2$ reflected by the reflective member 20 is incident on the light-receiving element 22. The light-receiving element 22 of the present embodiment is an example of a second light-receiving section according to an embodiment of the present disclosure.

Figure 2B:
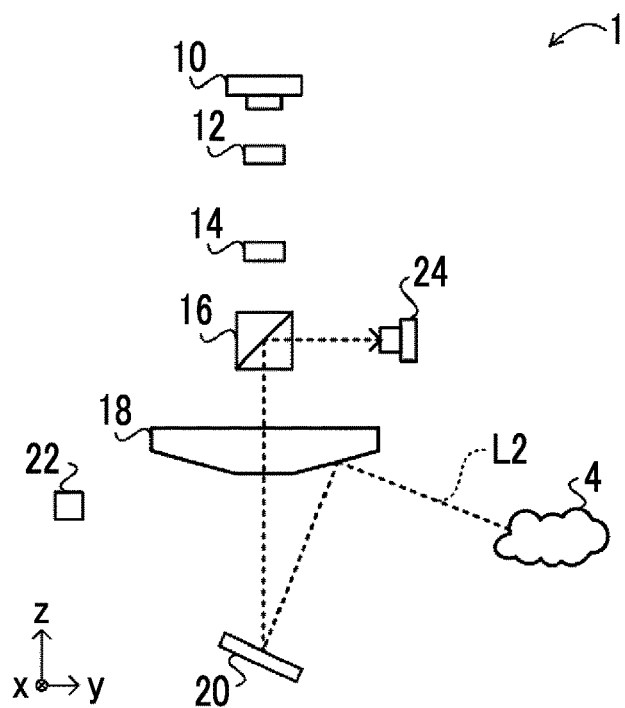
FIG. 2B is a diagram for describing an optical path of reflected light reflected by an object to be measured.

In addition, as illustrated in FIG. 2B, reflected light L2 reflected by the object to be measured 4 is reflected by the polarization optical member 18 and then, is reflected by the reflective member 20. Furthermore, the reflected light L2 is transmitted through the polarization optical member 18, reflected by the beam splitter 16, and received by the light-receiving element 24. The light-receiving element 24 of the present embodiment is an example of a first light-receiving section according to an embodiment of the present disclosure.

The light source 10 has a function of emitting light used for measuring the distance to the object to be measured 4. In the present embodiment, a semiconductor laser that emits laser having a wavelength centered at 905 nm is used as an example of the light source 10. Specifically, the light source 10 uses a pulse laser diode that releases a high peak light output. The pulse laser diode can release a high peak light output by generating light in accordance with a pulse trigger signal (details will be described later) input from the control unit 30. The released light output is a few tens of W to a few hundreds of W.

As illustrated in FIG. 1, as an example, the polarization optical member 18 of the present embodiment uses an omnidirectional lens that has a rotationally symmetric shape about a z axis and has a polarization direction of 360° (omnidirectional). The polarization optical member 18 of the present embodiment includes a transmitting unit 18A and a reflecting unit 18B. The transmitting unit 18A is a hole formed at a center of the polarization optical member 18 along the z axis and has a function of transmitting light heading toward the reflective member 20 from the light source 10 and the reflected light reflected by the reflective member 20. The reflecting unit 18B has a function of reflecting the light reflected by the reflective member 20 toward the object to be measured 4 and reflecting the light reflected by the reflective member 20 toward the light-receiving element 22. As described above, since the polarization direction of the polarization optical member 18 of the present embodiment is 360°, a horizontal scan is performed by polarizing the light reflected by the reflective member 20 at 360° in the horizontal direction.

The reflective member 20 has a function of varying a scan angle for scanning the object to be measured 4 with the light from the light source 10 and reflecting the light from the light source 10 for each varied scan angle.

In the present embodiment, a micro electro mechanical system (MEMS) mirror is used as the reflective member 20, and a trajectory of the light reflected by the reflective member 20 forms a circular shape by rotating the reflective member 20 about the z axis passing through the mirror as a rotation axis. The scan angle is varied by rotating the reflective member 20. The scan angle in the present embodiment corresponds to a so-called angle of view in the LiDAR system. An angle of a range in which the reflective member 20 in the distance measurement device 1 of the present embodiment varies the scan angle is 360°. Thus, a horizontal angle of view is 360°.

In a case where a MEMS mirror is used as the reflective member 20, a displacement amount of an angle (rotation) of a mirror 50 is relatively small and insignificant. However, a radius of the circular shape of the trajectory of light projected in the direction of 360° can be increased by using the polarization optical member 18 comprising an enlarging optical system. Thus, the scan angle can be accurately detected by installing the light-receiving element 24, described later, on an optical path after the polarization optical member 18.

Figure 3:
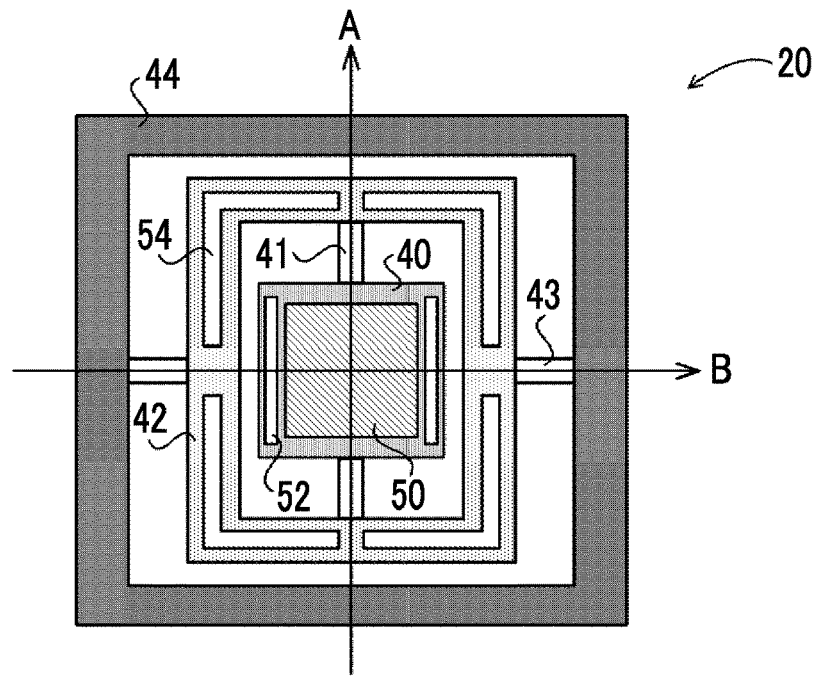
FIG. 3 is a structure diagram illustrating an example of a structure of a MEMS mirror that is a reflective member of the embodiment.

An example of a structure of the MEMS mirror that is the reflective member 20 of the present embodiment is illustrated in FIG. 3. The reflective member 20 of the present embodiment comprises a mirror unit 40, a torsion bar 41, a movable frame 42, a torsion bar 43, and a fixing unit 44.

The mirror unit 40 includes the mirror 50 for reflecting light. The mirror 50 rotates in accordance with rotation of the mirror unit 40. The torsion bar 41 pivotally supports the mirror unit 40 in a rotatable manner about an axis A as a rotation axis. The movable frame 42 supports the mirror unit 40 and the torsion bar 41. The torsion bar 43 pivotally supports the movable frame 42 in a rotatable manner about an axis B as a rotation axis. The fixing unit 44 supports these structures.

In addition, as illustrated in FIG. 3, a driving unit 52 is provided on the mirror unit 40. The driving unit 52 generates a torque for rotationally moving the mirror unit 40 about the axis A as a rotation axis. In addition, a driving unit 54 is provided on the movable frame 42. The driving unit 54 generates a torque for rotationally moving the movable frame 42 about the axis B as a rotation axis. Actuators (not illustrated) provided in the driving unit 52 and the driving unit 54 are considered to be of an electromagnetic driving type, an electrostatic driving type, a piezoelectric driving type, and the like and are not limited to any thereof.

For example, in a case where the actuators are of the electromagnetic driving type, a mechanism of generating electromagnetic force for swinging the mirror unit 40 and the movable frame 42 by causing a driving current to flow in a coil wiring line formed as a pattern in each of the driving unit 52 and the driving unit 54 in a state where an outside magnetic field is formed by arranging a permanent magnet (not illustrated) on an outside is used. In addition, in a case where the actuators are of the electrostatic driving type, fine-tooth comb electrodes are formed to face each other in each of the driving unit 52 and the driving unit 54, and an electrostatic actuator in which one of the fine-tooth comb electrodes functions as a rotor and the other functions as a stator is formed. A mechanism of swinging the mirror unit 40 and the movable frame 42 based on electrostatic attraction generated by applying a voltage between the rotor and the stator is used. In addition, in a case where the actuators are of the piezoelectric driving type, a piezoelectric thin film and an upper electrode and a lower electrode formed in a state where the piezoelectric thin film is sandwiched therebetween in a film thickness direction are comprised in each of the driving unit 52 and the driving unit 54. A mechanism of generating a torque for swinging the mirror unit 40 and the movable frame 42 by applying a voltage between the upper electrode and the lower electrode to excite contraction and expansion based on a piezoelectric effect and generate flexural vibration of a vibration plate is used. Examples of a material of the piezoelectric thin film include aluminum nitride, barium titanate, and piezoelectric zirconate titanate (PZT).

In any of the types, preferably, it is desirable to apply a torque of a sinusoidal wave to the driving unit 52 and the driving unit 54 to excite resonance vibration in which the mirror unit 40 and the movable frame 42 rotationally move about the axis A and the axis B, respectively. Accordingly, swinging at a large angle can be performed with lower input power. In this case, an amplitude of the driving voltage is reflected on a rotation angle of the mirror unit 40 (mirror 50), and a frequency of the driving voltage is reflected on an operation frequency of the mirror unit 40 (mirror 50). Here, a scan along the circular trajectory can be performed by setting the same rotation frequency about the axis A and the axis B and appropriately setting operation phases of both of the mirror unit 40 and the movable frame 42. Furthermore, a spiral scan by modulating the amplitude of the driving voltage to change the diameter of the circle can be performed. A frequency with which the reflective member 20 is driven is not limited to a resonance frequency and may be a frequency other than the resonance frequency.

The beam splitter 16 is positioned between the light source 10 and the polarization optical member 18 on the optical path of the light source 10 and the reflective member 20. In addition, the beam splitter 16 is positioned on the optical path between the reflective member 20 and the light-receiving element 24. The beam splitter 16 has a function of causing the light from the light source 10 to pass in a direction of the reflective member 20 and guiding the reflected light reflected in a direction of the light source 10 by the reflective member 20 to the light-receiving element 24.

In a case where the scan angle of the reflective member 20 is a specific angle, the light-receiving element 22 receives light that is emitted from the light source 10 and reflected by the reflective member 20 and the polarization optical member 18 in this order. In other words, the light-receiving element 22 receives a part of scan light for scanning the object to be measured 4. Intensity of the light received by the light-receiving element 22 is the same as the laser output used for distance measurement and is a few tens of W to a few hundreds of W. However, the light can be attenuated to avoid saturation of the light-receiving element 22 by comprising a neutral density (ND) filter or the like on a front surface of the light-receiving element 22. Examples of the light-receiving element 22 include an avalanche photodiode. In addition, it is desirable to eliminate an effect of light (sunlight or the like) other than the reflected light from the object by providing a wavelength filter that transmits only the laser wavelength on the front surface of the light-receiving element 22.

The light-receiving element 24 receives the reflected light after the light guided by the polarization optical member 18 is reflected by the object to be measured 4. Examples of the light-receiving element 24 include an avalanche photodiode. In addition, it is desirable to eliminate an effect of light (sunlight or the like) other than the reflected light from the object by providing a wavelength filter that transmits only the laser wavelength on the front surface of the light-receiving element 24.

The control unit 30 controls the entire distance measurement device 1 and is connected to each of the light source 10, the reflective member 20, the light-receiving element 22, and the light-receiving element 24 in a wired or wireless manner in order to perform a control related to the measurement of the distance to the object to be measured 4. In FIG. 1, in order to avoid complication in the drawing, connection of the control unit 30 to the light source 10, the reflective member 20, the light-receiving element 22, and the light-receiving element 24 is not illustrated.

Specifically, the control unit 30 outputs the pulse trigger signal (hereinafter, simply referred to as a "trigger signal") for emitting light from the light source 10 to the light source 10. In the light source 10, the light source 10 is set to an ON state in accordance with the trigger signal, and light is emitted from the light source 10. As described above, the light source 10 emits light by generating light in accordance with the trigger signal input from the control unit 30. Thus, the number of times the trigger signal is input into the light source 10 is the number of times of light generation the light source 10 emits light.

In addition, the control unit 30 performs a control of rotating the mirror unit 40 of the MEMS mirror that is the reflective member 20 as described above. In addition, a light-receiving signal representing that light is received is input into the control unit 30 from each of the light-receiving element 22 and the light-receiving element 24.

In addition, the control unit 30 includes a fine time measurement circuit (time to digital converter), not illustrated, and derives distance data representing the distance to the object to be measured 4 by obtaining a time of flight of light from the output of the trigger signal to the input of the light-receiving signal from the light-receiving element 24 by the fine time measurement circuit.

The control unit 30 of the present embodiment derives the scan angle based on the light-receiving signal input from the light-receiving element 22. Three-dimensional positional information of the object to be measured 4 can be acquired by acquiring distance measurement data as a set of the distance data and the scan angle derived based on the light-receiving signal input from the light-receiving element 24 by the control unit 30.

Hereinafter, distance measurement processing of deriving the scan angle and associating the scan angle with the distance data in an operation for measuring the distance to the object to be measured 4 by the control unit 30 will be described as an action of the distance measurement device 1 of the present embodiment.

Figure 4:
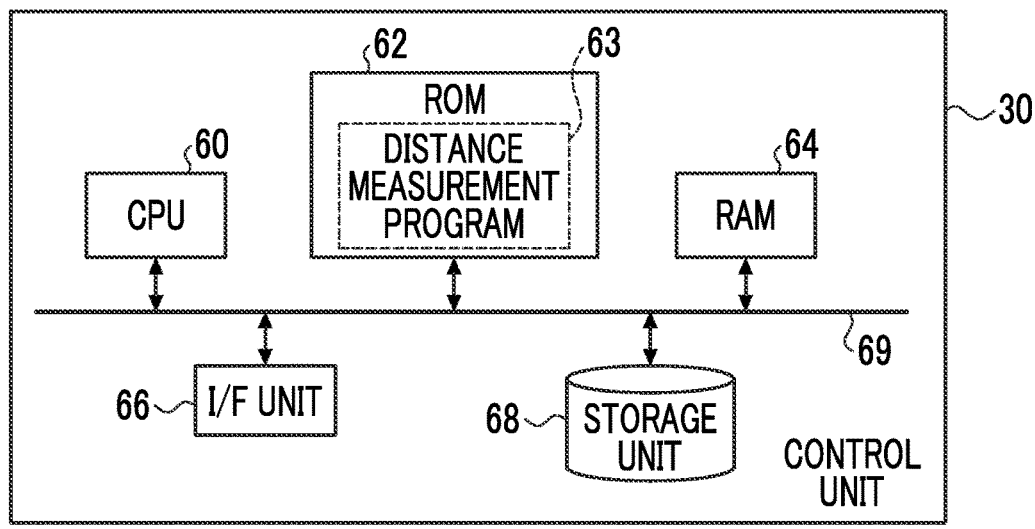
FIG. 4 is a configuration diagram illustrating an example of a hardware configuration of a control unit of the embodiment.

An example of a hardware configuration of the control unit 30 of the present embodiment is illustrated in FIG. 4. As illustrated in FIG. 4, the control unit 30 of the present embodiment comprises a central processing unit (CPU) 60, a read only memory (ROM) 62, a random access memory (RAM) 64, an interface (I/F) unit 66, and a storage unit 68. The CPU 60, the ROM 62, the RAM 64, the I/F unit 66, and the storage unit 68 are connected through a bus 69 such as a system bus or a control bus so that various information can be exchanged between each other.

The ROM 62 stores various programs and the like including a distance measurement program 63 executed by the CPU 60 in advance. The RAM 64 temporarily stores various data. The CPU 60 of the present embodiment is an example of a processor according to the embodiment of the present disclosure. In addition, the distance measurement program 63 of the present embodiment is an example of a distance measurement program according to the embodiment of the present disclosure.

The storage unit 68 stores the distance measurement data and other various information and the like. Specific examples of the storage unit 68 include a hard disk drive (HDD) and a solid state drive (SSD).

The I/F unit 66 communicates various information among the light source 10, the reflective member 20, the light-receiving element 22, and the light-receiving element 24 based on wireless communication or wired communication. In addition, the I/F unit 66 communicates various information with a device outside the distance measurement device 1 based on wireless communication or wired communication. As an example, in the present embodiment, the distance to the object to be measured 4 is measured in accordance with an instruction from the device outside the distance measurement device 1, and the distance measurement data is output to the outside device or the like in accordance with an instruction from the device outside the distance measurement device 1. Unlike the present embodiment, a form of comprising an input device and a display device such as a display in the control unit 30 may be applied, and a from of performing distance measurement in accordance with an instruction directly provided to the control unit 30 by a user and displaying a distance measurement result on the display device such as the display comprised in the control unit 30 may be applied.

Figure 5:
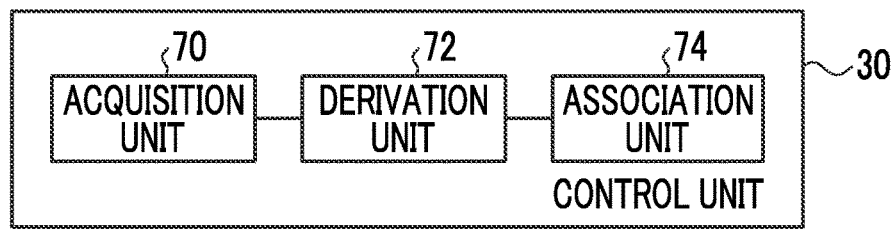
FIG. 5 is a functional block diagram illustrating an example of a functional configuration of the control unit of the embodiment.

Furthermore, a functional block diagram of an example of a functional configuration of the control unit 30 of the present embodiment is illustrated in FIG. 5. As illustrated in FIG. 5, the control unit 30 comprises an acquisition unit 70, a derivation unit 72, and an association unit 74. As an example, in the control unit 30 of the present embodiment, the CPU 60 functions as the acquisition unit 70, the derivation unit 72, and the association unit 74 by executing the distance measurement program 63 stored in the ROM 62 by the CPU 60.

The acquisition unit 70 acquires the number of times the control unit 30 outputs the trigger signal to the light source 10 between a time Ts at which the light-receiving element 22 receives light and a time Te at which the light-receiving element 22 receives light after the time Ts. As described above, in the light source 10, light is generated in accordance with the trigger signal input from the control unit 30. Thus, the number of times the control unit 30 outputs the trigger signal to the light source 10 is considered to be equal to the number of times of light generation of the light source 10. In a case where the object to be measured 4 is not a transparent object such as a glass object, the light-receiving element 24 receives the reflected light after the light emitted from the light source 10 is reflected by the object to be measured 4 as described above. Thus, the number of times the light-receiving element 24 receives the reflected light is considered to be equal to the number of times of light generation of the light source 10. Specifically, a time at which the light-receiving signal is received from the light-receiving element 22 is the time Ts. Then, a time at which the light-receiving signal is received again from the light-receiving element 22 is the time Te. In addition, the acquisition unit 70 acquires the number of times the control unit 30 outputs the trigger signal to the light source 10 from the time Ts to the time Te. The time Ts of the present embodiment is an example of a first time according to the embodiment of the present disclosure. The time Te of the present embodiment is an example of a second time according to the embodiment of the present disclosure.

The derivation unit 72 derives the scan angle corresponding to the reflected light received by the light-receiving element 24 based on the number of times, acquired by the acquisition unit 70, the control unit 30 outputs the trigger signal to the light source 10. The association unit 74 associates the scan angle derived by the derivation unit 72 with the distance measurement data corresponding to the reflected light received by the light-receiving element 24.

Figure 6:
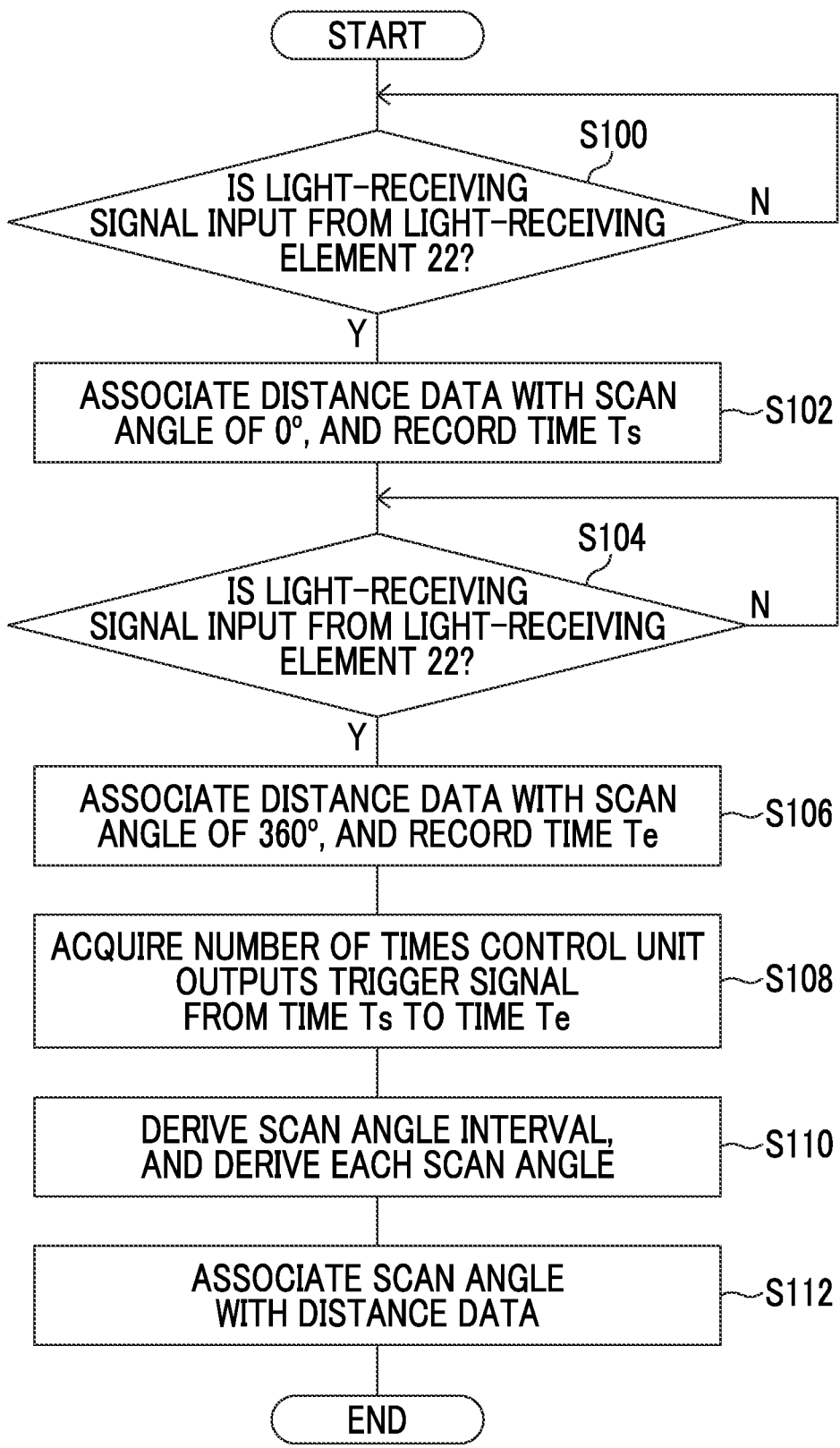
FIG. 6 is a flowchart representing an example of distance measurement processing executed by the control unit.

In addition, a flowchart representing an example of the distance measurement processing is illustrated in FIG. 6. In the present embodiment, the distance measurement processing illustrated in FIG. 6 is executed by executing the distance measurement program 63 stored in the ROM 62 by the CPU 60.

In step S100 in FIG. 6, the acquisition unit 70 determines whether or not the light-receiving signal is input from the light-receiving element 22. The determination in step S100 results in a negative determination until the light-receiving signal is input from the light-receiving element 22. On the other hand, in a case where the light-receiving signal is input from the light-receiving element 22, the determination in step S100 results in a positive determination, and a transition is made to step S102.

In step S102, the acquisition unit 70 associates 0° as the scan angle with the distance data derived based on a time from the output of the trigger signal to the input of the light-receiving signal from the light-receiving element 24. In addition, the acquisition unit 70 records a time representing a distance measurement time point as the time Ts.

In the distance measurement device 1 of the present embodiment, a scan operation is repeated by varying the scan angle with a constant scan angle interval. Thus, in the horizontal scan, the light-receiving element 24 receives light reflected by the reflective member 20 and the polarization optical member 18 in this order at the time Ts and then, receives light reflected by the reflective member 20 and the polarization optical member 18 in this order again.

Therefore, the acquisition unit 70 determines whether or not the light-receiving signal is input from the light-receiving element 22 in step S104. The determination in step S104 results in a negative determination until the light-receiving signal is input from the light-receiving element 22. On the other hand, in a case where the light-receiving signal is input from the light-receiving element 22, the determination in step S104 results in a positive determination, and a transition is made to step S106.

In step S106, the acquisition unit 70 associates 360° that is the maximum angle in performance terms of the distance measurement device 1 as the scan angle with the distance data derived based on the time from the output of the trigger signal to the input of the light-receiving signal from the light-receiving element 24. In addition, the acquisition unit 70 records the time representing the distance measurement time point as the time Te.

In next step S108, the acquisition unit 70 acquires the number of times the control unit 30 outputs the trigger signal to the light source 10, that is, the number of scans, from the time Ts to the time Te. A method of acquiring the number of scans by the acquisition unit 70 is not particularly limited. For example, the acquisition unit 70 may acquire the number of scans using a counter, not illustrated, by setting a count at the time Ts to 1 and incrementing the count each time the trigger signal is output to the light source 10 until counting at the time Te. The number of scans acquired by the acquisition unit 70 is output to the derivation unit 72.

In next step S110, the derivation unit 72 derives the scan angle and derives the scan angle for each scan. As an example, the derivation unit 72 of the present embodiment derives the scan angle of each scan based on a value obtained by dividing the range (in the present embodiment, 360°) of the scan angle by a number (n−1) obtained by subtracting 1 from a number of scans n acquired in step S108. The scan angle of each scan derived by the derivation unit 72 is output to the association unit 74.

As a specific example, a case where the number of scans acquired in step S108 is five and n=5 is established will be described. A value (n−1) obtained by subtracting 1 from the number of scans n is 5−1=4. In a case where 360° that is the range of the scan angle is divided by 4, 90° (360±4=90°) is obtained as the scan angle interval. Accordingly, it is perceived that the scan is performed every 90° in the distance measurement device 1. From this point, the derivation unit 72 derives the scan angles in five scans as 0°, 90°, 180°, 270°, and 360° (0°).

In next step S112, the association unit 74 obtains the distance measurement data by associating the scan angle of each scan derived in step S110 with the distance data in each scan. The distance measurement data obtained by doing so may be output to the storage unit 68 and stored in the storage unit 68 or may be output to the device or the like outside the control unit 30. An output destination of the obtained distance measurement data is not particularly limited and, for example, may be predetermined in accordance with specifications of the distance measurement device 1 or may be settable by the user. In a case where the processing in step S112 ends, the distance measurement processing illustrated in FIG. 6 ends.

By doing so as illustrated in FIG. 6, the horizontal scan with respect to the object to be measured 4 at a specific position in the vertical direction ends.

The distance measurement device 1 of the present embodiment is not limited to the form illustrated in FIG. 1 and, for example, may be configured as in Modification Example 1 and Modification Example 2 below.

Modification Example 1

In the distance measurement device 1 illustrated in FIG. 1, while a form in which only the horizontal scan of the object to be measured 4 is performed is applied, a form of further performing a vertical scan and having a vertical angle of view may also be applied.

For example, a scan in the z axis direction, that is, the vertical scan, can be performed by adjusting the rotation angle of the mirror 50 as an angle of a reflecting surface of the reflective member 20 to perform a control for a state where the trajectory of the light reflected by the reflective member 20 forms a spiral shape. For example, in a case where the scan angle in the horizontal scan reaches 360° from 0°, an inclination of the mirror 50 of the reflective member 20 is adjusted so that a scanning position in the vertical direction is changed, and the horizontal scan is performed again at the position in the vertical direction after change.

Figure 7:
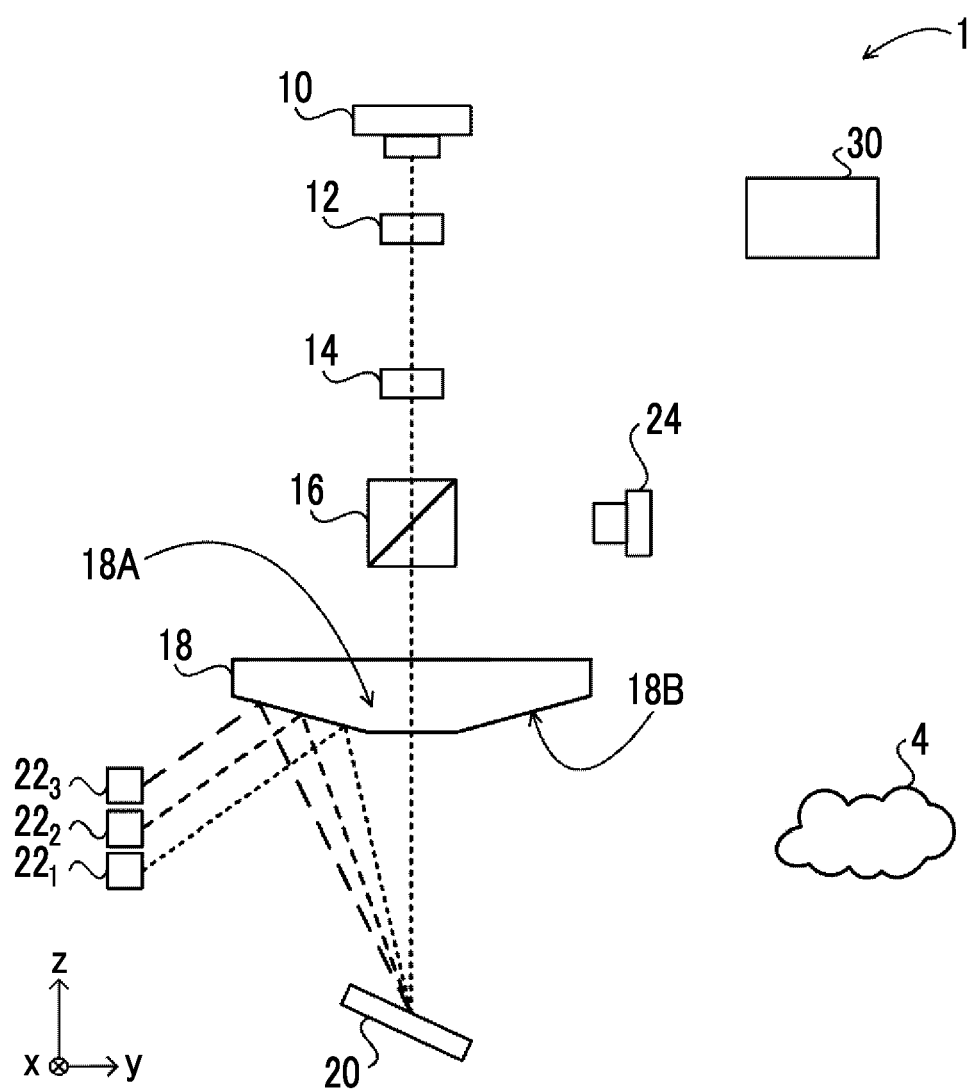
FIG. 7 is a configuration diagram illustrating an example of a distance measurement device of Modification Example 1.

An example of a configuration of the distance measurement device 1 of the present modification example is illustrated in FIG. 7. As illustrated in FIG. 7, the distance measurement device 1 of the present modification example comprises light-receiving elements $22_1$, $22_2$, and $22_3$ as a plurality (in FIG. 7, three) of the light-receiving elements 22 in a direction (in FIG. 7, the z axis direction) intersecting with a direction in which the polarization optical member 18 guides light to the object to be measured 4.

In the distance measurement processing in the distance measurement device 1 of the present embodiment, the vertical scan can be performed by repeating the distance measurement processing illustrated in FIG. 6 for each vertical scan position. In the reflective member 20 that is a MEMS mirror, the displacement amount of the angle (rotation) of the mirror 50 is relatively small and insignificant. However, since the scan angle in the vertical direction can be enlarged by using the polarization optical member 18 comprising an enlarging optical system, detection accuracy of the scan angle can be improved.

Modification Example 2

While the distance measurement device 1 illustrated in FIG. 1 is in the form of a coaxial optical system in which a light projection optical system and a light-receiving optical system have a common optical path, a form of a non-coaxial optical system in which an optical path of the light projection optical system is separated from an optical path of the light-receiving optical system may also be applied.

Figure 8:
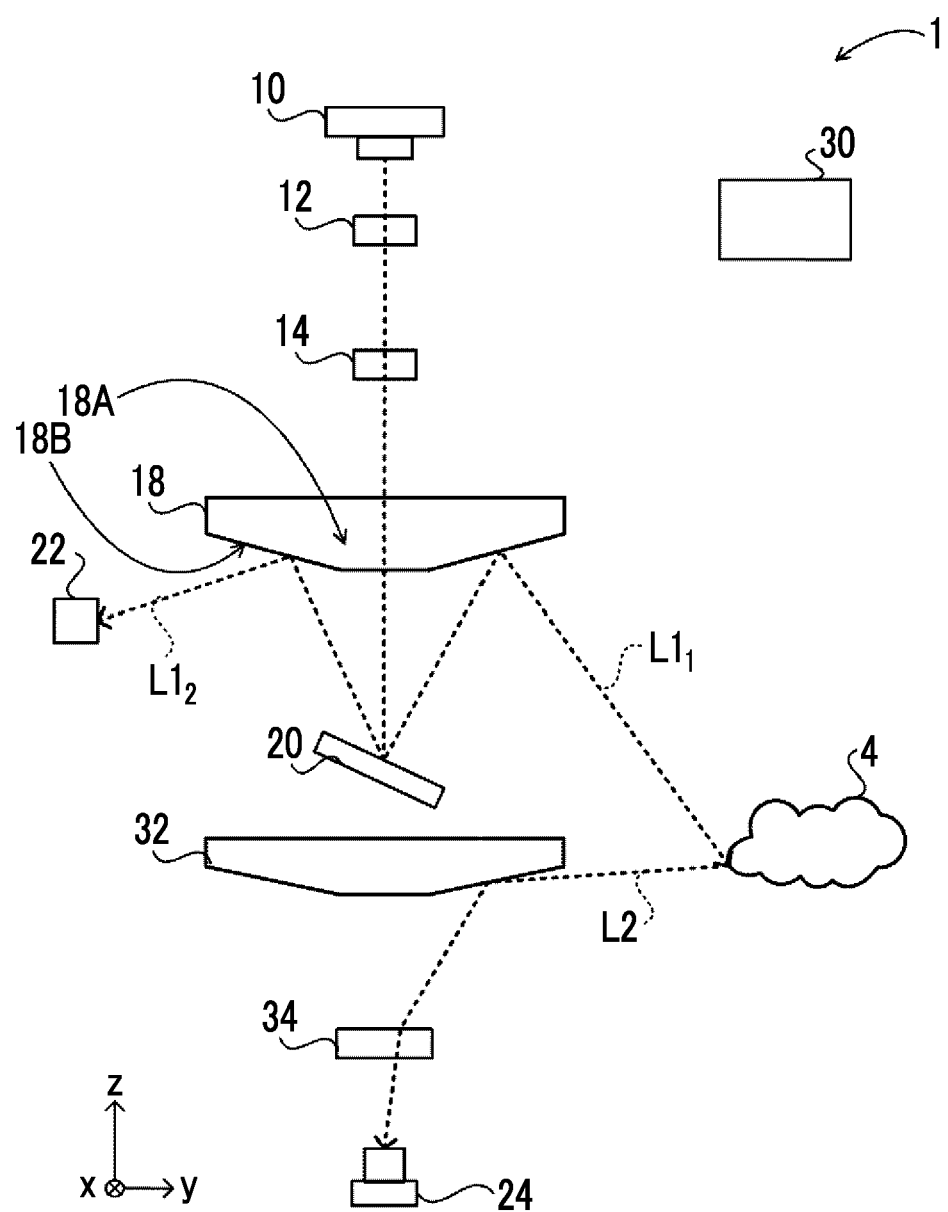
FIG. 8 is a configuration diagram illustrating an example of a distance measurement device of Modification Example 2.

An example of a configuration of the distance measurement device 1 of the present modification example is illustrated in FIG. 8. As illustrated in FIG. 8, the distance measurement device 1 of the present modification example further comprises a polarization optical component 32 and an optical component 34 at a position on an opposite side of the reflective member 20 from a side on which the polarization optical member 18 is provided. The polarization optical component 32 of the present embodiment is an example of an optical component according to the embodiment of the present disclosure.

The polarization optical component 32 has a function of guiding the reflected light L2 reflected by the object to be measured 4 in a direction different from the direction of the light source 10. Thus, in the distance measurement device 1 of the present embodiment, a position at which the light-receiving element 24 is provided is different from in a case of the distance measurement device 1 of the coaxial optical system illustrated in FIG. 1. In addition, as illustrated in FIG. 8, the beam splitter 16 is not comprised in the distance measurement device 1 of the non-coaxial optical system.

As illustrated in FIG. 8, in the present embodiment, the reflected light L2 is reflected by the polarization optical component 32 and is incident on the light-receiving element 24 after an incidence angle is adjusted by transmitting the reflected light L2 through the optical component 34.

Intensity of the reflected light L2 is relatively weak. Thus, examples of a method for securing the intensity include enlarging an aperture of the light-receiving optical system. However, in order to use this method in the coaxial optical system, it is necessary to increase a size of the mirror 50 of the reflective member 20 that polarizes a light projection direction, thereby imposing limitations. On the other hand, by using the non-coaxial optical system in the distance measurement device 1, the aperture of the light-receiving optical system can be enlarged without increasing the size of the mirror 50 of the reflective member 20. Thus, in the distance measurement device 1 of the non-coaxial optical system, restrictions in the above method for securing the intensity of the reflected light L2 are alleviated.

As described so far, the distance measurement device 1 of each embodiment comprises the light source 10, the polarization optical member 18, the reflective member 20, the light-receiving element 22, and the light-receiving element 24. The reflective member 20 varies the scan angle for scanning the object to be measured 4 with the light from the light source 10 and reflects the light from the light source 10 for each varied scan angle. The polarization optical member 18 guides the light reflected by the reflective member 20 to the object to be measured 4. The light-receiving element 24 receives the reflected light after the light guided by the polarization optical member 18 is reflected by the object to be measured 4. In a case where the scan angle of the reflective member 20 is the specific angle, the light-receiving element 22 receives the light reflected by the reflective member 20 and the polarization optical member 18 in this order.

According to the above configuration, the scan angle can be derived based on a light-receiving result of the reflected light by the light-receiving element 22 that receives the light reflected by the reflective member 20 and the polarization optical member 18 in this order. Thus, according to the distance measurement device 1, the detection accuracy of the scan angle for scanning the object to be measured 4 with light from the light source 10 can be improved.

Particularly, in a case where the reflective member 20 is a MEMS mirror, there is a tendency that size reduction and weight reduction are achieved and power consumption can be suppressed, compared to a case of mechanically rotating a prism or a mirror. Thus, such a case is preferable. However, there is a tendency that behavior of the MEMS mirror is susceptible to effects of an environmental change, an individual difference, a temporal change, and the like. On the other hand, the behavior of the MEMS mirror is almost constant within a time required for one horizontal scan or vertical scan. In addition, since the scan angle is not derived based on the behavior of the reflective member 20 for each scan performed a plurality of times in one horizontal scan or vertical scan, the detection accuracy of the scan angle can be further improved.

In the present embodiment, while the wavelength of the light source 10 is 905 nm, other wavelengths such as 1500 nm providing high safety for eyes may also be used.

In addition, in the present embodiment, while a form in which the reflective member 20 is a MEMS mirror (refer to FIG. 3) has been described, the present invention is not limited to a MEMS mirror and may also be applied to a form of mechanically rotating a prism or a mirror.

In addition, in the present embodiment, while a form in which the control unit 30 controls the light source 10, the reflective member 20, the light-receiving element 22, and the light-receiving element 24 and performs the distance measurement processing (refer to FIG. 6) has been described, a control unit that controls the reflective member 20 and the like and a control unit that performs the distance measurement processing may be separately configured.

In addition, in the embodiment, for example, the following various processors can be used as a hardware structure of a processing unit that executes various processing of the acquisition unit 70, the derivation unit 72, and the association unit 74. The various processors include, in addition to a CPU that is a general-purpose processor functioning as various processing units by executing software (program) as described above, a programmable logic device (PLD) that is a processor such as a field programmable gate array (FPGA) having a circuit configuration changeable after manufacturing, a dedicated electric circuit that is a processor such as an application specific integrated circuit (ASIC) having a circuit configuration dedicatedly designed to execute specific processing, and the like.

One processing unit may be composed of one of the various processors or may be composed of a combination of two or more processors of the same type or different types (for example, a combination of a plurality of FPGAs or a combination of a CPU and an FPGA). In addition, a plurality of processing units may be composed of one processor.

As an example in which the plurality of processing units are composed of one processor, first, as represented by a computer such as a client and a server, a form in which one processor is composed of a combination of one or more CPUs and software and the processor functions as the plurality of processing units is possible. Second, as represented by a system on chip (SoC) and the like, a form of using a processor that implements functions of the entire system including the plurality of processing units in one integrated circuit (IC) chip is possible. Accordingly, the various processing units are configured using one or more of the various processors as a hardware structure.

Furthermore, more specifically, an electric circuit (circuitry) in which circuit elements such as semiconductor elements are combined can be used as the hardware structure of the various processors.

In addition, in the embodiment, while an aspect in which the distance measurement program 63 is stored (installed) in advance in the ROM 62 has been described, the present invention is not limited thereto. The distance measurement program 63 may be provided in the form of a recording on a recording medium such as a compact disc read only memory (CD-ROM), a digital versatile disc read only memory (DVD-ROM), and a universal serial bus (USB) memory. In addition, the distance measurement program 63 may be in the form of a download from an outside device through a network.

The disclosure of Japanese Patent Application No. 2020-125848 filed on Jul. 22, 2020 is incorporated in the present specification by reference in its entirety.

All documents, patent applications, and technical standards disclosed in the present specification are incorporated in the present specification by reference to the same extent as in a case where each of the documents, patent applications, technical standards are specifically and individually indicated to be incorporated by reference.

Explanation of References

1: distance measurement device
4: object to be measured
10: light source
12, 14: collimator lens
16: beam splitter
18: polarization optical member
20: reflective member
22, $22_1$, $22_2$, $22_3$, 24: light-receiving element
30: control unit
32: polarization optical component
34: optical component
40: mirror unit
41, 43: torsion bar
42: movable frame
44: fixing unit
50: mirror
52, 54: driving unit
60: CPU
62: ROM
63: distance measurement program
64: RAM
66: I/F unit
68: storage unit
69: bus
70: acquisition unit
72: derivation unit
74: association unit
A, B, x, y, z: axis
L1, $L1_1$, $L1_2$: light
L2: reflected light

What is claimed is:
1. A distance measurement device comprising:
a light source;
a reflective member that varies a scan angle for scanning an object to be measured with light from the light source and reflects the light from the light source for each varied scan angle;
a polarization optical member that guides the light reflected by the reflective member to the object to be measured;
a first light-receiving section that receives reflected light after the light guided by the polarization optical member is reflected by the object to be measured; and
a second light-receiving section that receives the light reflected by the reflective member and the polarization optical member in this order in a case where the scan angle of the reflective member is a specific angle, wherein the polarization optical member includes a transmitting unit through which the light heading toward the reflective member from the light source is transmitted, and a reflecting unit that reflects the light reflected by the reflective member toward the object to be measured and reflects the light reflected by the reflective member toward the second light-receiving section.

2. The distance measurement device according to claim 1, wherein a plurality of the second light-receiving sections are provided in a direction intersecting with a direction in which the polarization optical member guides the light to the object to be measured.

3. The distance measurement device according to claim 1, wherein:
the reflective member reflects the light a plurality of times by varying the scan angle after the light is reflected in a state where the specific angle is set as the scan angle until the light is reflected in a state where the scan angle is set as the specific angle again,
the distance measurement device further comprises at least one processor, and
the processor is configured to:
acquire the number of times of light generation of the light source corresponding to the reception of the reflected light by the first light-receiving section between a first time at which the second light-receiving section receives the light and a second time at which the second light-receiving section receives the light after the first time; and
derive the scan angle corresponding to the reflected light received by the first light-receiving section based on the number of times of light generation.

4. The distance measurement device according to claim 3, wherein the processor is configured to derive the scan angle based on a value obtained by dividing an angle of a range in which the reflective member varies the scan angle by a number obtained by subtracting 1 from the number of times of light generation.

5. The distance measurement device according to claim 3, wherein the processor is configured to associate the scan angle with distance measurement data corresponding to the reflected light received by the first light-receiving section.

6. The distance measurement device according to claim 1, wherein:
the polarization optical member further guides the reflected light reflected by the object to be measured to the reflective member and guides the reflected light reflected by the reflective member in a direction of the light source, and
the first light-receiving section receives the reflected light guided in the direction of the light source by the polarization optical member.

7. The distance measurement device according to claim 6, further comprising a beam splitter that is positioned on an optical path between the light source and the reflective member and on an optical path between the reflective member and the first light-receiving section, causes the light to pass in a direction of the reflective member, and guides the reflected light reflected in the direction of the light source by the reflective member to the first light-receiving section.

8. The distance measurement device according to claim 1, further comprising an optical component that guides the reflected light reflected by the object to be measured in a direction different from a direction of the light source, wherein the first light-receiving section receives the reflected light guided in the direction different from the direction of the light source by the optical component.

9. The distance measurement device according to claim 1, wherein the reflective member is a MEMS mirror.

10. A distance measurement method by a distance measurement device including a light source, a reflective member that varies a scan angle for scanning an object to be measured with light from the light source and reflects the light from the light source for each varied scan angle, a polarization optical member that guides the light reflected by the reflective member to the object to be measured, a first light-receiving section that receives reflected light after the light guided by the polarization optical member is reflected by the object to be measured, and a second light-receiving section that receives the light reflected by the reflective member and the polarization optical member in this order in a case where the scan angle of the reflective member is a specific angle, wherein the polarization optical member includes a transmitting unit through which the light heading toward the reflective member from the light source is transmitted, and a reflecting unit that reflects the light reflected by the reflective member toward the object to be measured and reflects the light reflected by the reflective member toward the second light-receiving section, in which the reflective member reflects the light a plurality of times by varying the scan angle after the light is reflected in a state where the specific angle is set as the scan angle until the light is reflected in a state where the scan angle is set as the specific angle again, the distance measurement method executed by a processor, comprising:
acquiring the number of times of light generation of the light source corresponding to the reception of the reflected light by the first light-receiving section between a first time at which the second light-receiving section receives the light and a second time at which the second light-receiving section receives the light after the first time;
deriving the scan angle corresponding to the reflected light received by the first light-receiving section based on the number of times of light generation; and
associating the scan angle with distance measurement data corresponding to the reflected light received by the first light-receiving section.

11. A non-transitory computer-readable memory storing a distance measurement program causing a processor to execute a process for distance measurement by a distance measurement device including a light source, a reflective member that varies a scan angle for scanning an object to be measured with light from the light source and reflects the light from the light source for each varied scan angle, a polarization optical member that guides the light reflected by the reflective member to the object to be measured, a first light-receiving section that receives reflected light after the light guided by the polarization optical member is reflected by the object to be measured, and a second light-receiving section that receives the light reflected by the reflective member and the polarization optical member in this order in a case where the scan angle of the reflective member is a specific angle, wherein the polarization optical member includes a transmitting unit through which the light heading toward the reflective member from the light source is transmitted, and a reflecting unit that reflects the light reflected by the reflective member toward the object to be measured and reflects the light reflected by the reflective member toward the second light-receiving section, in which the reflective member reflects the light a plurality of times by varying the scan angle after the light is reflected in a state where the specific angle is set as the scan angle until the light is reflected in a state where the scan angle is set as the specific angle again, the distance measurement program causing the processor to execute a process comprising:
- acquiring the number of times of light generation of the light source corresponding to the reception of the reflected light by the first light-receiving section between a first time at which the second light-receiving section receives the light and a second time at which the second light-receiving section receives the light after the first time;
- deriving the scan angle corresponding to the reflected light received by the first light-receiving section based on the number of times of light generation; and
- associating the scan angle with distance measurement data corresponding to the reflected light received by the first light-receiving section.

\* \* \* \* \*